UNITED STATES PATENT OFFICE.

WALTER WEBER, OF DUSSELDORF, GERMANY, ASSIGNOR TO THE FIRM OF HENKEL & CIE., OF DUSSELDORF, GERMANY.

PROCESS FOR THE CATHODIC PRODUCTION OF SOLID PEROXID COMPOUNDS.

1,169,703. Specification of Letters Patent. Patented Jan. 25, 1916.

No Drawing. Application filed March 1, 1915. Serial No. 11,338.

*To all whom it may concern:*

Be it known that I, WALTER WEBER, Ph. D., chemist, citizen of the German Empire, residing at Dusseldorf, Germany, have invented certain new and useful Improvements in Processes for the Cathodic Production of Solid Peroxid Compounds, of which the following is a specification.

My invention relates to a method for producing solid peroxids and more especially to the production of such compounds by means of electrolysis.

M. Traube and Priess have shown by experiments that the cathodic production of hydrogen peroxid under atmospheric pressure is not commercial. In the patent application of Franz Fischer, Serial Number 766,091, filed May 7, 1913, however, a method of cathodic production of hydrogen peroxid has been described which allows of producing hydrogen peroxid in commercial concentration and with commercial output. The said process is based upon the application of a pressure superior to atmospheric pressure, both the introduction of the gases containing oxygen and the electrolysis being effected under such increased pressure.

I have ascertained that contrary to former experiences it is feasible to produce hydrogen peroxid at the cathode in a utilizable form under ordinary pressure, provided that care is taken to prevent the accumulation of hydrogen peroxid within the electrolyte by precipitating it in the form of a solid peroxid compound either intermittently or continuously.— This is easily attained by adding to the electrolyte, into which oxygen gas in the form either of oxygen or gases containing oxygen is introduced, such soluble compounds as will form with the hydrogen peroxid forming at the cathode peroxid compounds either insoluble or at least little soluble in water. If an electrolyte adapted to form insoluble peroxid compounds is used, then the addition of soluble compounds such as mentioned above need not be made.

In order to insure a commercial output it is preferable to cause the reaction to take place at a low temperature and therefore to provide for a sufficient cooling, preferably down to about 0 degree. In order to further raise the output stabilizing compounds such as starch, gelatin, boric or phosphoric acid should be added to the electrolyte.

The process according to the invention lends itself to the production, among others, of peroxides and peroxid hydrates of the metals of the alkaline earths, such as barium peroxid and calcium peroxid, or of magnesium peroxid and aluminum peroxid, as well as of salts of the perboric acids, such as sodium perborate.

Example. 20 g. borax, 4.2 g. sodium hydrate and 22 g. sodium sulfate or 30 g. sodium phosphate ($Na_2HPO_4,12H_2O$) are dissolved in 1000 ccm. water. This solution is electrolyzed with a cathode consisting for instance of amalgamated silver and with an anode consisting of platinum or lead and separated from the cathode space by a diaphragm-tube, oxygen being continuously introduced and the solution being vigorously stirred by mechanical stirring apparatus and kept at approximately 0 degrees C. by placing the electrolytic cell in a refrigerating solution. Pure sodium perborate containing 10.3 per cent. of active oxygen is obtained, the output per unit of current employed being very high. Borax and sodium hydrate are continuously supplied afresh, as the sodium perborate is removed, this removal being a continuous one also. The density of current at the cathode is for instance 0.2 ampere per 100 square centimeters.

Other metals may be used for the electrodes, and other compounds forming with hydrogen peroxid insoluble peroxids may be used as electrolytes and additions.

I am aware that it has been proposed to make peroxid compounds and especially peroxids of the metals by electrolyzing the corresponding neutral or weakly alkaline solutions of the salts or pure solutions of alkalis or alkaline earths at the anode by aid of superposed continuous and alternating currents. With this method, however, the electrodes are attacked and their products of decomposition will soil the peroxid compounds as well as the electrolyte. The products of decomposition in accumulating tend to prevent continuous working, and for these reasons it is impossibe to produce pure peroxid compounds after this method. Moreover the output as compared with the current consumed is unsatisfactory.

I claim:—

1. Process for the continuous cathodic production of solid peroxid compounds, which consists in electrolyzing a watery electrolyte containing oxygen gas, adding suitable soluble compounds adapted to form with the hydrogen peroxid generated at the cathode peroxid compounds substantially insoluble in water, continuously supplying fresh oxygen and removing the peroxid compounds separated out.

2. Process for the continuous cathodic production of solid peroxid compounds, which consists in electrolyzing a watery electrolyte containing oxygen gas and cooled down to about 0 degr. C., preventing the accumulation of hydrogen peroxid by adding suitable soluble compounds adapted to form with the hydrogen peroxid generated at the cathode peroxid compounds substantially insoluble in water, continuously supplying fresh oxygen and removing the insoluble peroxid compounds formed.

3. Process for the continuous cathodic production of solid peroxid compounds, which consists in electrolyzing a watery suitable soluble compounds adapted to form with the hydrogen peroxid generated at the cathode peroxid compounds substantially insoluble in water, adding suitable stabilizing compounds, continuously supplying fresh oxygen and removing the insoluble peroxid compounds separated out.

In testimony whereof I have hereunto set my hand in presence of two subscribing witnesses.

WALTER WEBER. [L. S.]

Witnesses:
 HELEN NUFER,
 ALBERT NUFER.